Jan. 23, 1923.
W. E. ELLIOTT.
FEEDING APPARATUS.
FILED AUG. 18, 1919.
1,442,866
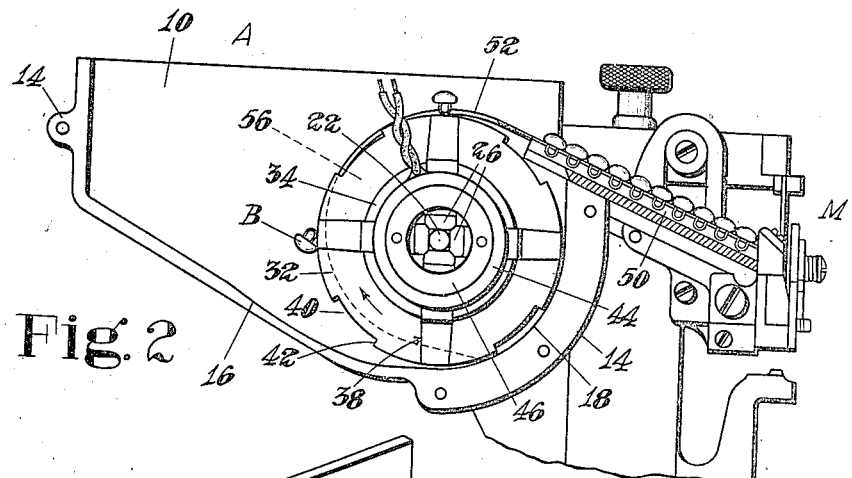
Fig. 2
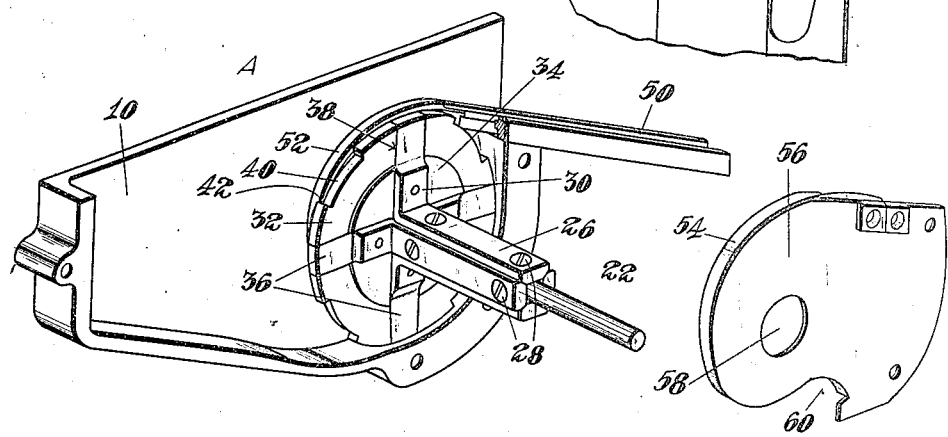
Fig. 3
Fig. 4
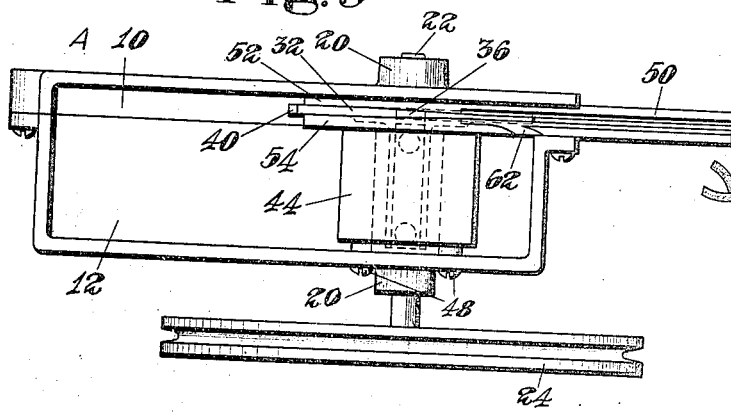
Fig. 1
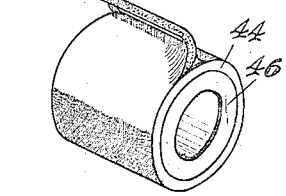
Fig. 5
INVENTOR
William E. Elliott Patented Jan. 23, 1923.

1,442,866

UNITED STATES PATENT OFFICE.

WILLIAM E. ELLIOTT, OF GRAND RAPIDS, MICHIGAN, ASSIGNOR TO AMERICAN BUTTON & FASTENER CO., OF AUGUSTA, MAINE, A CORPORATION OF MAINE.

FEEDING APPARATUS.

Application filed August 18, 1919. Serial No. 318,236.

*To all whom it may concern:*

Be it known that I, WILLIAM E. ELLIOTT, a citizen of the United States, residing at Grand Rapids, in the county of Kent and State of Michigan, have invented certain Improvements in Feeding Apparatus, of which the following description, in connection with the accompanying drawings, is a specification, like reference characters on the drawings indicating like parts in the several figures.

This invention relates to apparatus for feeding various objects from a mass to a device or mechanism which is to receive or operate on them, it being especially adapted for thus supplying such fasteners as buttons.

It is a purpose of the invention to provide a simple apparatus of this character which will insure, by its operation, a continuous supply of the objects with the expenditure of but little power.

In the attainment of this purpose, a feature of the invention consists in a novel organization in which separated magnetic feeding or conveying members travel through the objects contained in a receptacle, and are magnetized by means common to all, which is preferably stationary. In the illustrated apparatus, there is a shaft carrying the magnetic feeding members, while a coil or other magnetizing means is secured to the receptacle. In this way, the energizing current may be supplied through stationary conductors. Preferably, there co-operates with the magnetic members, non-magnetic means for shielding certain of the surfaces, as those transverse to the direction of revolution.

To insure the proper disposition of the objects held by the conveying members, I provide, as another feature of the invention, removing means extending downwardly into the receptacle to a point near the bottom at the sides of the conveying members eccentrically to the extremities thereof. By such removing means the objects are directed to the most advantageous positions at the ends of the conveying members, and are then stripped therefrom in their movement. This eccentricity is preferably different at the opposite sides of the conveying members, serving in the present embodiment of the invention to hold the objects to be fed away from one side to prevent clogging the apparatus, and giving free access to the conveying members at the opposite side during a portion of their travel to permit them to attract and hold the objects which are removed later in the advance.

A further feature concerns means for preventing the objects fed from massing in the receptacle beneath the conveying means when this assumes a disk form. For this purpose the disk has at its periphery agitating means, as depressions, operating in the same plane as the conveying means and which, without materially resisting movement, change the positions of the objects as they await engagement by the conveying members. With magnetic members spaced by non-magnetic members I prefer to have the latter effect the agitation of the objects, since the magnetic portions, by their attractive force, tend to draw the objects together, rather than to loosen them.

Still other features will hereinafter be made evident, reference being had to the accompanying drawing, in which Fig. 1 is a top plan view of a particular embodiment of the invention;

Fig. 2 is a broken side elevation with one section of the receptacle removed and the raceway in section;

Fig. 3 is a perspective view of the portions of the apparatus illustrated in Fig. 2, but with the mechanism to which the objects are supplied omitted;

Fig. 4 is a similar view of one of the removing members; and

Fig. 5 shows, in perspective, the energizing coil.

I have illustrated my improved feeding apparatus in connection with a portion of a button-setting machine M, though it is capable of many other utilizations. Secured to or formed integrally with the frame of this machine M is a section 10 of a receptacle A for the buttons or other objects to be fed. The receptacle is completed by a second section 12 of greater width, there being a division between the sections in a vertical plane, and they being secured to one another by screws passing through flanges or lugs 14. At the bottom of both sections is an inclined wall 16 terminating in a curved wall 18, which is generally circular. Journaled in bosses 20 projecting outwardly from the side walls of the receptacle is a shaft 22, which may be rotated by power applied to a pulley 24. This shaft carries the button-elevating or conveying device, this preferably including separated members to which the eyes of the buttons are held by magnetic attraction. The members may consist of four soft iron bars having portions 26 extending parallel to the shaft, with their axes 90 degrees apart, and secured to the shaft by screws 28. Portions 30 of the bars are bent at right angles to the securing portions, and extend radially from the shaft to points adjacent to the wall 18 of the receptacle. To prevent the surfaces of the magnetic members which are transverse to the direction of advance from attracting and holding the buttons, they are spaced by segments 32 of nonmagnetic material, as brass. These spacing members are shown as directly interposed only between the outer or active portions of the conveying members, the construction illustrated consisting of a circular plate 34, one face of which the members 30 overlie. The ends 36 of the conveying arms are bent to enter radial slots 38 in the plate, and are here flush with both sides. The arms 36 and segments 32 form together a disk, the periphery of which lies close to the portion 18 of the receptacle. Spaced about the edge of this disk, being preferably located near the centers of the outer edges of the nonmagnetic portions, are depressions 40, furnishing at their ends shoulders, the rearward, 42, of which engage objects in the receptacle to agitate them and prevent their packing beneath the disk at the point from which they are to be raised. The disk, with its magnetic arms, lies close to the vertical wall of the section 10 of the receptacle, and upon the opposite side, within the section 12, the portions 26 of the magnet bars are surrounded by energizing means, consisting of a coil 44 of wire of a suitable gage carried upon a tubular spool 46, which may be fixed to the vertical wall of the section 12 by screws 48. With such an arrangement it is unnecessary to use a collector device for delivering current to the magnetizing coil of the conveying arms, and difficulties in maintenance of the electrical portion of the apparatus are avoided.

The buttons raised by the arms are stripped therefrom at the upper portion of the receptacle for delivery to a downwardly inclined raceway 50 leading to the mechanism M, by a pair of removing members 52 and 54 lying at opposite sides of the disk. These members are shown as consisting of flanges projecting toward one another from the edges of plates 56, 56 supported upon the receptacle and having openings 58 through which the shaft and portions 26 of the magnetic bars pass. The member 52 preferably substantially fills the space between the disk and the vertical wall of the receptacle section 10, so that no portion of a button can enter and clog the movable elements of the apparatus. This member starts from a point somewhat above the lowermost peripheral portion of the disk, and extends in a generally circular path eccentrically to the periphery of the disk, crossing it near the upper portion and there joining the upper end of the raceway above the disk. The member 54 is curved as best shown in Fig. 4, rising first upwardly from the lower edge of the disk, and then passing toward its periphery to leave a space 60 which permits the buttons to there contact with the sides of the magnetic members. Beyond this space the member 54 follows the curvature of the companion member and similarly joins the raceway. The members or corresponding raceway portions are shown as cut away at 62, the space formed connecting with the portion 12 of the receptacle to cause buttons improperly placed upon the ends of the members 36 for entrance to the raceway to be returned to the receptacle without clogging.

A supply of buttons being placed in the receptacle, they slide down the inclined wall 16 beneath the edge of the disk, and are there successively subjected to the attractive force of the arms 36 moved continuously through them by the rotation of the carrying shaft 22. As the elevating surface moving through them approaches closely to an unbroken cylinder, the resistance offered to its travel is negligible; while it is found that if separated arms are employed, on which there are surfaces transverse to the direction of rotation, they will require much power to revolve them, sometimes causing the slipping of the belt, and mutilating the buttons by bending the eyes or marring the heads. There is, however, in my improved feeder, enough disturbance produced by the shoulders 42 in the buttons gathered below the edge of the disk, to guard against their bridging or packing in such a manner that they will be held out of contact with the conveying arms. But, if much force is opposed to the movement of these shoulders, they slip over the buttons by forcing them radially outward a relatively short distance. The certainty with which the buttons may be gathered upon the ends of the arms in the correct position for delivery to the raceway is increased by the space 60 in the supporting plate of the flange 54. Into the recess thus formed the buttons are attracted to the sides of the arm, and then, upon being raised in the rotation of the disk into contact with the member 54 over the space 60, are wiped out to the periphery of the disk, assuming positions upon the ends of the arms, as indicated at B in Fig. 2 of the drawing. Thus held, the eyes enter between the members 52 and 54, as these approach, in their eccentricity, the edge of the disk, and, as the disk and members separate near the end of the raceway, the ends of the arms travel away from the buttons, leaving them supported by the members. They are now resting upon downwardly inclined surfaces, over which they descend by gravity into the raceway, and are delivered to the apparatus which is to receive them. If the angle at which the buttons are held upon the ends of the arms is not such that they will be correctly received by the raceway, they will either be forced off by the members 52, 54, when first contacting therewith, or will be displaced and returned to the hopper through the space 62.

Having described my invention, what I claim as new and desire to secure by Letters Patent of the United States is:—

1. In a feeding apparatus, a receptacle, separated magnetic feeding members revoluble in the receptacle, and magnetizing means fixed to the receptacle common to the separated feeding members.

2. In a feeding apparatus, a receptacle, separated magnetic feeding members revoluble in the receptacle, non-magnetic shielding means provided with agitating means and co-operating with the feeding members, and magnetizing means common to the feeding members.

3. In a feeding apparatus, a receptacle, magnetic feeding members revoluble in the receptacle, stationary magnetizing means for the feeding members, and non-magnetic means for shielding the magnetic surfaces of the feeding members.

4. In a feeding apparatus, a receptacle, magnetic arms revoluble in the receptacle, magnetizing means within which portions of the arms revolve, non-magnetic shields interposed between the arms, and removing means co-operating with the arms.

5. In a feeding apparatus, a receptacle, conveying members movable in the receptacle and provided with means for holding the objects to be fed, and removing means in the receptacle at the sides of the members, said removing means having object-receiving recesses from which object-removing surfaces extend eccentrically to the extremities of the members.

6. In a feeding apparatus, a receptacle, conveying members movable in the receptacle and provided with means for holding the objects to be fed, and object-removing means extending downwardly into the receptacle at the sides of the members and eccentrically to the extremities thereof, such eccentricity being different at opposite sides of the members.

7. In a feeding apparatus, a receptacle, a conveying member rotatable in the receptacle, and a member co-operating with the conveying member from a point near the bottom of the receptacle to move conveyed objects outwardly over the side of said conveying member toward its periphery.

8. In a feeding apparatus, a receptacle, a conveying member rotatable in the receptacle, and a removing member lying in proximity to the side of the conveying member, the removing member extending from near the lower edge of the conveying member upwardly and toward the edge thereof and then along said edge.

9. In a feeding apparatus, a receptacle, a conveying member rotatable in the receptacle, and a removing member lying in proximity to the side of the conveying member, the removing member extending from near the lower edge of the conveying member upwardly and toward the edge thereof and then along said edge and outwardly eccentrically thereto.

10. In a feeding apparatus, a receptacle, conveying members movable in close proximity to one side of the receptacle and being spaced more widely from the opposite side, and fastener-removing means extending downwardly into the receptacle at the sides of the members and eccentrically to the extremities thereof, such eccentricity being greater at the side spaced from the receptacle.

11. In a feeder for fasteners, a receptacle, and a fastener-conveying disk movable in the receptacle and furnished at is periphery with fastener-agitating means and associated conveying means operating in the same plane.

12. In a feeder for fasteners, a receptacle, and a fastener-conveying disk movable in the receptacle and furnished at its periphery with fastener-agitating depressions and intermediate conveying surfaces.

13. In a feeder for fasteners, a receptacle, magnetic fastener-conveying members revoluble therein, and non-magnetic spacing means provided with fastener-agitating means between and in the same plane as the conveying members.

14. In a feeder for fasteners, a receptacle, a shaft rotatable therein, a magnetic member projecting from the shaft into the receptacle, magnetizing means secured to the receptacle and co-operating with the magnetic member, and fastener-removing means co-operating with the magnetic member.

15. In a feeder for fasteners, a receptacle, a shaft rotatable therein, a magnetic member extending along the shaft and fixed thereto and having a fastener-conveying projection radiating from said shaft, a coil surrounding the shaft and the portion of the magnetic member fixed thereon, and fastener-removing means co-operating with the projecting portion of the member.

16. In a feeder for fasteners, a receptacle, a shaft rotatable therein, a magnetic member extending along the shaft and fixed thereto and having a fastener-conveying projection radiating from said shaft, and a coil secured to the receptacle and surrounding the shaft.

17. In a feeder for fasteners, a receptacle, a shaft rotatable therein, magnetic arms fixed to the shaft and extending therefrom into the receptacle, non-magnetic segments interposed between the arms, and fastener-removing means between which the arms move.

18. In a feeder for fasteners, a receptacle, a shaft rotatable therein, magnetic arms radiating from the shaft into the receptacle, non-magnetic segments interposed between the arms and provided with peripheral depressions, and fastener-removing means between which the arms move.

19. In a feeder for fasteners, a receptacle, a shaft rotatable therein, a magnetic member extending along the shaft and fixed thereto and having a fastener-conveying projection radiating from said shaft, a non-magnetic portion co-operating with the projection to form a disk and fastener-removing means co-operating with the projection.

In testimony whereof I have signed my name to this specification.

WILLIAM E. ELLIOTT.